US012443900B2

(12) United States Patent
Johnston et al.

(10) Patent No.: US 12,443,900 B2
(45) Date of Patent: Oct. 14, 2025

(54) AUTOMATIC CREATION AND EXECUTION OF A TEST HARNESS FOR WORKFLOWS

(71) Applicant: INTERNATIONAL BUSINESS MACHINES CORPORATION, Armonk, NY (US)

(72) Inventors: Michael Johnston, Dublin (IE); Vasileios Vasileiadis, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 17/138,843

(22) Filed: Dec. 30, 2020

(65) Prior Publication Data

US 2022/0207438 A1 Jun. 30, 2022

(51) Int. Cl.
| | |
|---|---|
| G06Q 10/06 | (2023.01) |
| G06F 8/65 | (2018.01) |
| G06F 11/36 | (2025.01) |
| G06F 11/3668 | (2025.01) |
| G06Q 10/10 | (2023.01) |

(52) U.S. Cl.
CPC .............. *G06Q 10/06* (2013.01); *G06F 8/65* (2013.01); *G06F 11/3684* (2013.01); *G06Q 10/10* (2013.01)

(58) Field of Classification Search
CPC .......... G06Q 10/06; G06Q 10/10; G06F 8/65; G06F 11/3684
See application file for complete search history.

(56) References Cited

U.S. PATENT DOCUMENTS 7,010,454 B1 * 3/2006 Potter, IV ........ G01R 31/31718
717/124
7,299,382 B2 11/2007 Jorapur
(Continued)

FOREIGN PATENT DOCUMENTS

| CN | 108763091 A | 11/2018 |
| CN | 109684194 A | 4/2019 |

(Continued)

OTHER PUBLICATIONS

V. K. Pallipuram, J. DiMarco and M. Taufer, "Applying frequency analysis techniques to dag-based workflows to benchmark and predict resource behavior on non-dedicated clusters," 2014 IEEE International Conference on Cluster Computing (CLUSTER), Madrid, Spain, 2014, pp. 29-37 (Year: 2014).*

(Continued)

*Primary Examiner* — Jerry O'Connor
*Assistant Examiner* — Philip N Warner
(74) *Attorney, Agent, or Firm* — CHIP LAW GROUP (57) ABSTRACT

A computer implemented method for automatically creating and executing a test harness for a workflow includes creating a workflow package including a version identification and a workflow graph definition and creating a workflow instance as a copy of the workflow package. The workflow instance is executed to generate output data and the output data is saved into the workflow instance. The workflow instance is saved, with the output data, as a test archive. One or more components of an updated workflow package are tested with the test archive; and an indication of pass or fail of the testing of the updated workflow package is outputted.

26 Claims, 6 Drawing Sheets

(56) References Cited

U.S. PATENT DOCUMENTS

| | | | | |
|---|---|---|---|---|
| 7,340,725 | B1* | 3/2008 | Robinson | G06F 11/2273 717/124 |
| 8,131,840 | B1* | 3/2012 | Denker | H04L 69/12 709/200 |
| 8,712,815 | B1* | 4/2014 | Nichols | G06Q 10/00 705/7.11 |
| 9,696,971 | B1 | 7/2017 | Wierda et al. | |
| 9,734,044 | B2 | 8/2017 | Harden et al. | |
| 10,019,344 | B1 | 7/2018 | Chheda et al. | |
| 10,157,122 | B1 | 12/2018 | Gohil et al. | |
| 11,003,571 | B2 | 5/2021 | Mitra | |
| 11,169,798 | B1* | 11/2021 | Palmer | H04L 41/16 |
| 11,829,280 | B1* | 11/2023 | Zhang | G06F 11/3692 |
| 2007/0001683 | A1* | 1/2007 | Krigel | G01R 31/58 324/538 |
| 2008/0255822 | A1* | 10/2008 | Adir | G06F 11/263 703/21 |
| 2010/0251209 | A1 | 9/2010 | Murthy | |
| 2013/0019126 | A1* | 1/2013 | Frohlich | G06F 11/3688 714/E11.02 |
| 2014/0075242 | A1* | 3/2014 | Dolinina | G06F 11/3672 714/E11.178 |
| 2015/0143064 | A1* | 5/2015 | Bhargava | G06F 11/1435 711/162 |
| 2017/0171034 | A1* | 6/2017 | Lucas | H04L 41/22 |
| 2020/0004604 | A1* | 1/2020 | Lavoie | G06F 16/907 |
| 2020/0142712 | A1 | 5/2020 | Liu et al. | |
| 2020/0225287 | A1* | 7/2020 | Krishnakumar | G06F 11/3006 |
| 2020/0272433 | A1* | 8/2020 | Wang | G06F 8/30 |
| 2020/0319995 | A1* | 10/2020 | Mitra | G06F 11/3698 |
| 2021/0073026 | A1* | 3/2021 | Myers | G06F 11/3065 |
| 2021/0224047 | A1* | 7/2021 | Wang | G06F 8/30 |
| 2021/0326244 | A1* | 10/2021 | Stocker | G06F 11/3684 |
| 2022/0141088 | A1* | 5/2022 | Bandyopadhyay | H04L 41/0895 709/222 |

FOREIGN PATENT DOCUMENTS

| | | | | |
|---|---|---|---|---|
| CN | 114127696 | A * | 3/2022 | G06Q 10/06 |
| CN | 114691487 | A | 7/2022 | |
| DE | 102021130822.4 | A1 | 6/2022 | |
| EP | 2546749 | A1 | 1/2013 | |
| EP | 2 953 072 | A1 | 12/2015 | |
| EP | 3 901 865 | A1 | 10/2021 | |
| EP | 3948545 | A | 2/2022 | |
| GB | 2605483 | A | 10/2022 | |
| IN | 201621031723 | A | 3/2018 | |
| JP | 2005-085182 | A | 3/2005 | |
| JP | 2022-104880 | A | 7/2022 | |

OTHER PUBLICATIONS

Bures, M. "PCTgen: Automated Generation of Test Cases for Application Workflows"; ResearchGate (2015); 8 pgs.

Indian Patent Application No. 201621031723 entitled "System and Method for Automated Test Case Generation and Execution", filed Mar. 23, 2018; 28 pgs.

Karam, M. et al., "An Abstract Workflow-Based Framework for Testing Composed Web Services"; IEEE (2007); pp. 901-908.

Sarma, M. et al., "Automatic Test Case Generation from UML Sequence Diagrams"; IEEE (2007); pp. 60-.

Nebut, N. et al., "Automatic Test Generation: A Use Case Driven Approach"; IEEE Transactions on Software Engineering (2006); vol. 32:3; pp. 140-155.

Boucher, M. et al., "Transforming Workflow Models into Automated End-to-End Acceptance Test Cases"; IEEE/ACM 9th International Workshop on Modelling in Software Engineering (MiSE) (2017); 7 pgs.

"Software Testing and Case Analysis", retrieved from web https://www.geeksforgeeks. org/software-testing-test-analysis/, Dec. 31, 2012, p. 1.

Japan Patent Office, "Notice of Reasons for Refusal" May 7, 2025, 04 Pages, JP Application No. 2021-202996.

The State Intellectual Property Office of People's Republic of China, "Second Office Action", Jul. 11, 2025, 16 Pages, CN Application No. 202111267621.2.

* cited by examiner

AUTOMATIC CREATION AND EXECUTION OF A TEST HARNESS FOR WORKFLOWS

BACKGROUND

Technical Field

The present disclosure generally relates to methods for testing workflows, and more particularly, to methods for automatically creating and executing a test harness for workflows.

Description of the Related Art

Workflows are potentially complex pipelines of components (nodes) for processing data. A workflow is typically a direct acyclic graph (DAG) where the components are usually formed out of existing resources rather than built from scratch. They can include many workflow nodes, each implemented by many different developers and scientists who may be from different scientific disciplines.

Workflows are software programs and evolve by addition, removal, and modification of components and/or addition and removal of edges between the components. Of these various evolution processes, the modification of existing components does not change the workflow graph. However, errors in the modifications have the potential to break the expected processing behavior of the graph by, for example, causing the modified component, or downstream consumers of data produced by the modified component, to fail. As workflows are compositions of existing programs, configured with certain options, a relatively small set of programs can generate many different workflows.

The process of creating and maintaining a test harness for all of the workflow components can be very time consuming and certain tests may not be created or executed due to a lack of computational resources. This, in turn, may result in errors propagating to deployment environments that can, among other unwanted side effects, lead to instability and loss of productivity.

SUMMARY

According to various embodiments, a computing device, a non-transitory computer readable storage medium, and a method are provided for the automatic creation and execution of a test harness for workflows.

In one embodiment, a computer implemented method for automatically creating and executing a test harness for a workflow includes creating a workflow package including a version identification and a workflow graph definition and creating a workflow instance based on the workflow package. The method can execute the workflow instance to generate output data. The workflow instance is saved, with the output data, as a test archive. One or more components of an updated workflow package are tested with the test archive. An indication of pass or fail of the testing of the updated workflow package is outputted.

In some embodiments, the method further includes creating the workflow package including information on a transformation logic for each node.

In some embodiments, the indication includes results from each test performed on each of the one or more components.

In some embodiments, the method further includes generating the output data of the workflow instance via at least one of (a) executing one or more selected subgraphs from a plurality of subgraphs of the workflow to generate output data, and (b) populating other ones of the plurality of subgraphs with subgraph output data from a previously created workflow instance.

In some embodiments, the testing includes a plurality of tests comprising an input data test, a data staging test, an execution test, and an output comparison test.

In some embodiments, if one of the plurality of tests fail for a given component, the indication provided is a failure indication of both the given component and the workflow. In some embodiments, each of the plurality of tests are executed in order, where failure of one of the plurality of tests ends the testing and outputs a failure indication.

In some embodiments, the method further includes associating a test specification with the test archive, wherein the test specification defines which output data from the one or more components should be added to the test archive.

In some embodiments, the method further includes associating a test specification with the test archive, wherein the test specification permits customization of the testing and provides definitions of pass and fail.

In some embodiments, the method further includes permitting additional programs to be used in the test specification for a selected testing of the one or more components.

In some embodiments, the method further includes regenerating the test archive based on an instance of the updated workflow package.

According to various embodiments, a computer implemented method for automatically creating and executing a test harness for a workflow includes creating a workflow package including a version identification, a workflow graph definition, and a transformation logic of each of the one or more components of the workflow. A workflow instance is created based on the workflow package and the workflow instance is executed to generate output data. The workflow instance is saved with the output data as a test archive and the one or more components of an updated workflow package is tested with the test archive. The testing includes a plurality of tests comprising an input data test, a data staging test, an execution test and an output comparison test. An indication of pass or fail of the testing of the updated workflow package in outputted. Each of the plurality of tests are executed in order, where failure of one of the plurality of tests ends the testing and outputs a failure indication.

By virtue of the concepts discussed herein, a system and method are provided that improve upon the approaches currently used to test workflows. The system and methods discussed herein can improve the performance of workflow execution and reduce regressions caused by modification of workflows by automatically creating and executing a test harness, as described herein.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

As used herein, the term "workflow" refers to directed acyclic graphs, where the nodes represent computational procedures, tasks, or transformations, and edges indicate dependencies between the workflow nodes.

As used herein, the term "workflow node" refers to an application or service that is part of a workflow.

As used herein, the term "transformation logic" refers to the information that allows one to apply the transformation defined by the node. For example, transformation logic can be a specific script.

As used herein, the term "component" refers to a node in the workflow graph.

As used herein, the term "test harness" refers to a collection of software and test data configured to test a program unit (such as a script provided by a component of the workflow graph) by running the program unit under varying conditions and monitoring its behavior and outputs.

As used herein, the term "regression" refers to a software bug that makes a feature stop functioning as intended after a certain event, usually a change to the code.

The term "regression test" can apply to the entire test process as well as to one or more specific tests in the test process. For clarity, as used herein, the term "regression test" refers to the entire process of determining if a change to a workflow has led to a regression.

As used herein, the term "workflow package" refers to the specification of a workflow, including its components, the connections, the input data, and the like.

As used herein, the term "workflow instance" refers to a specific execution of a workflow package and may contain the files that are generated by tasks of the workflow nodes.

As used herein, the term "bundle" refers to a filesystem directory structure where the required files, components output locations, and the like, are elements within the structure, or a "bundle" can be a file including uniform resource locators (URLs) referencing data files and component output locations, or a "bundle" can be a combination of a filesystem directory structure and URLs.

As used herein, the term "platform" refers to a set of compute resources that can be used to execute a workflow, such as the cloud, clusters, or the like.

As discussed in greater detail below, the present disclosure generally relates to methods and systems for defining a representation of a workflow and its execution that explicitly links data (input/output) and transformation logic with the workflow graph. Aspects of the present disclosure can use this representation to automatically run regression tests of the components in the workflow graph. This can be accomplished by defining a specific workflow execution representation as the regression test archive and linking it to the workflow definition.

The process of regression testing may include four tests for each workflow component and a test that ensures the workflow syntax is valid. The component regression tests include an input data test, a data staging test, an execution test, and an output comparison test. The input data test determines whether all the component producers (that is, those components that produce data for input to the component being tested) are present and if test data is available for them in the test archive. This test further determines whether the required static input files are present in the test archive. The data staging test determines whether the specific files required by a given component are present in the test archive. The execution test determines whether the current definition of the component successfully executes on the input data. The output comparison test can determine whether the output of the execution test matches the expected output in the test archive. The output comparison test can be use-configurable and can include one or more separate sub-tests, testing different aspects of the output, such as names match, contents match, or the like. The workflow syntax test can determine whether the workflow definition is validated against the grammar of the workflow description language.

Aspects of the present disclosure can initially ensure that a workflow has the necessary representations. These representations are analogous to the concepts of class and instance that exist in object-oriented programming. The techniques described herein may be implemented in a number of ways. Example implementations are provided below with reference to the following figures.

Figure 1:
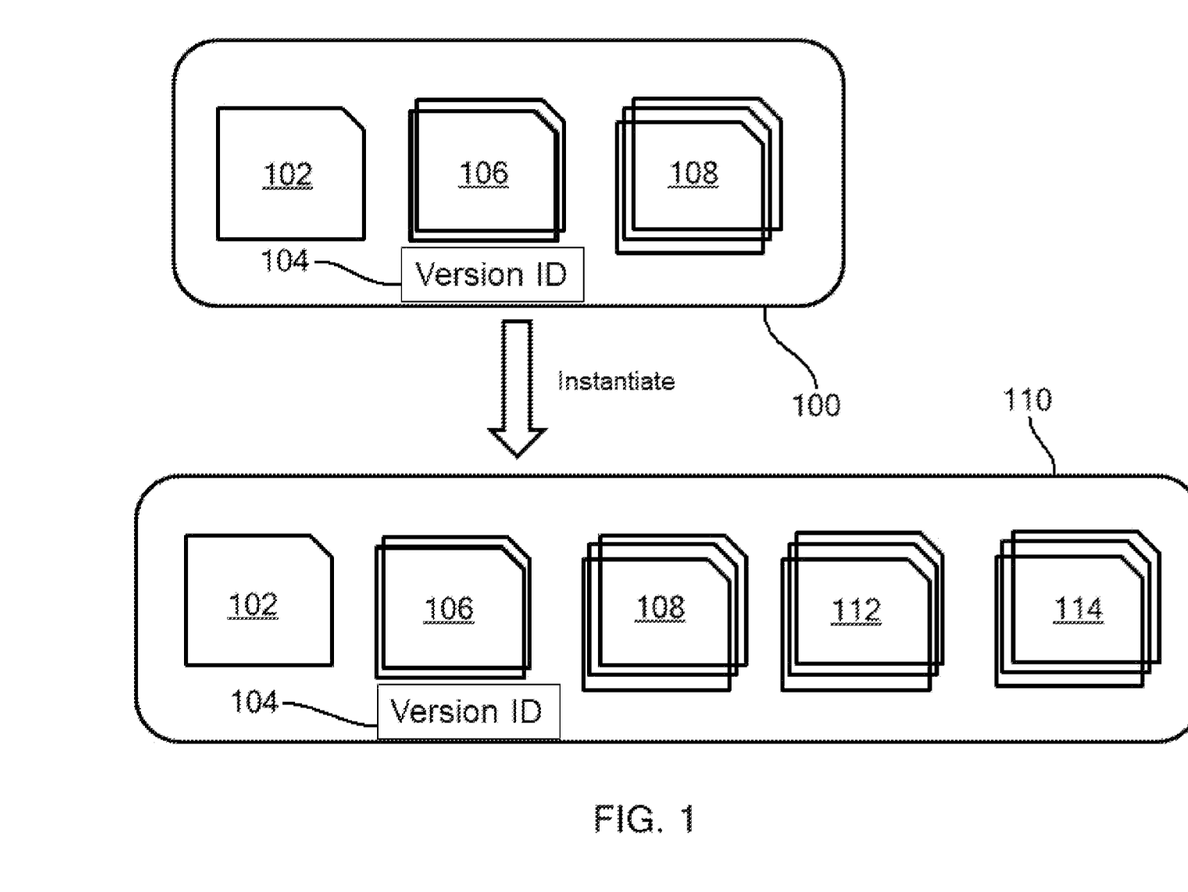
FIG. 1 is a representation of workflows and their execution, consistent with an illustrative embodiment.

Referring to FIG. 1, a workflow package 100 can include a bundle having the workflow graph definition 102, a version identification 104, and other optional data. The optional data can include, for example, required data files for workflow components 106, workflow specific transformation logic, workflow custom scripts 108, and the like. A workflow instance 110 can include a bundle representing the instantiation of a workflow package on a specific platform. The workflow instance includes the same contents as the workflow package (including the workflow graph definition 102, the version identification 104, the workflow required data resources 106, and the workflow custom scripts 108) with the addition of a user input directory (UID) 112, locations for the components outputs 114, and metadata on any optional data supplied.

When the workflow package 100 is instantiated, the resulting bundle of the workflow instance 110 will include no output data. If the instantiation is followed by workflow execution, the component outputs will be added as they are created.

Given that the workflow and its execution have the representations described above with respect to the workflow package 100 and the workflow instance 110, aspects of the present disclosure can include automatic regression testing.

A representative executed workflow instance 110 of the latest version of the workflow package 100 is associated with the workflow package 100 as the test archive. The test archive can be optionally compressed. Furthermore, data may be removed from the test archive for nodes that are not to be tested, that are too costly to teat, or that are not required to be tested. In some embodiments, once the test archive is created, all data referenced by it is always accessible and immutable. A test specification can include an optional specification that denotes which components in the workflow package 100 should be tested.

Automatic regression testing can occur each time a modification is made in the workflow package 100. For each tested component of the workflow, a unique workflow instance bundle structure is created, user inputs are added from the test archive into the workflow instance, and user overridden data files from the test archive can be added into the workflow instance. The regression tests can then be performed on the workflow instance.

For the input data test, for each producer of the component being tested, its data is added from the test archive to the correct output location in the workflow instance. For the data staging test, for each of the tested component's defined inputs, it is determined that the defined inputs are present in the workflow instance and any necessary operations, such as copying, is performed in the defined inputs. For the execution test, the component is executed using the specified platform and its exit status is captured. For the output comparison test, the outputs of the component are compared to the outputs of the same component in the test archive. The type of comparison can be user-defined, such as full text match, name match, or the like, and the comparison can be applied to only a subset of files. Finally, the syntax of the entire workflow is validated.

In one embodiment, each of the tests are considered pass/fail tests. A given test must be a pass before the next test can execute. If any step fails, the test stage ends with failure. If all steps pass, the component passes. Once all specific components have been tested, a report can be generated and provided as output from the system to the user. Run time modifiers, such as "coverage" can be added at the execution step. Optionally, many custom regression tests can be added, via the test specification described above, at the output comparison test.

Example Embodiment

The below describes an example embodiment of the present disclosure and should not be taken to limit the scope of the claims. The embodiment describes an automatic test generator called "Testify" that leverages the representations created as described above via a program called "Flow". The example can use git for version control and travis for automated test running on commit. The git-commit id/hash can be used as the version identification of a workflow package. Similarly the UID of a workflow instance can include the version of the associated workflow package. In the example, the transformation logic is in the form of scripts and executables.

A workflow package directory is versioned using, for example, git, where definition.yaml is the workflow graph definition file, a data folder holds data required for workflow execution, and a bin folder holds executables required for workflow execution. A directory that is a clone of the workflow package directory is made for a version vA. A workflowName-vA.instance folder holds the same files and directories as the workflow package directory plus additional structure, such as an inputs folder which holds user supplied input data, a stages folder which holds component output data in component specific directories that may be grouped into stages, and metadata.yaml is a metadata file that defines any metadata related to the execution of the workflow, such as replaced files in the data folder, arguments to workflow framework, or the like. The metadata file includes all the relevant information to execute the workflow package.

Figure 2:
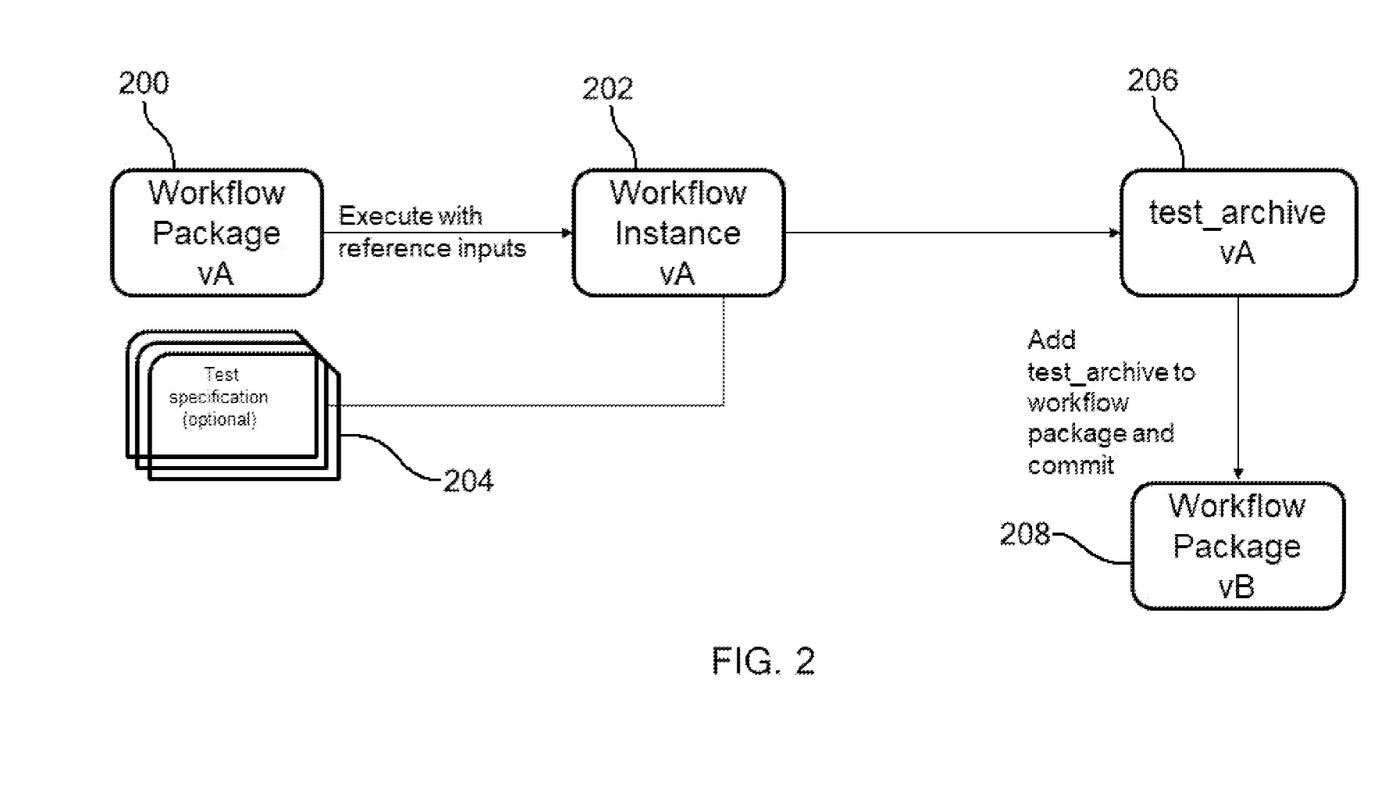
FIG. 2 is a representation of the creation of a test archive, consistent with an illustrative embodiment.

Referring now to FIG. 2, workflow package version vA 200 execute with reference inputs to generate workflow instance vA 202. The workflow instance vA 202, with optional test specifications 204, can be as the test archive vA 206. The test archive vA 206 can be added to the workflow package to generate workflow package vB 208. The test archive vA 206 augments the file structure of the workflow instance vA 202 by inserting the data required for the tests and some rules on the tests that will be executed for the components in the workflow. After the initial test archive is generated, the test archive is regenerated whenever changes are made to the workflow package definition, because the workflow graph and/or data the test archive represents no longer applied.

Figure 3:
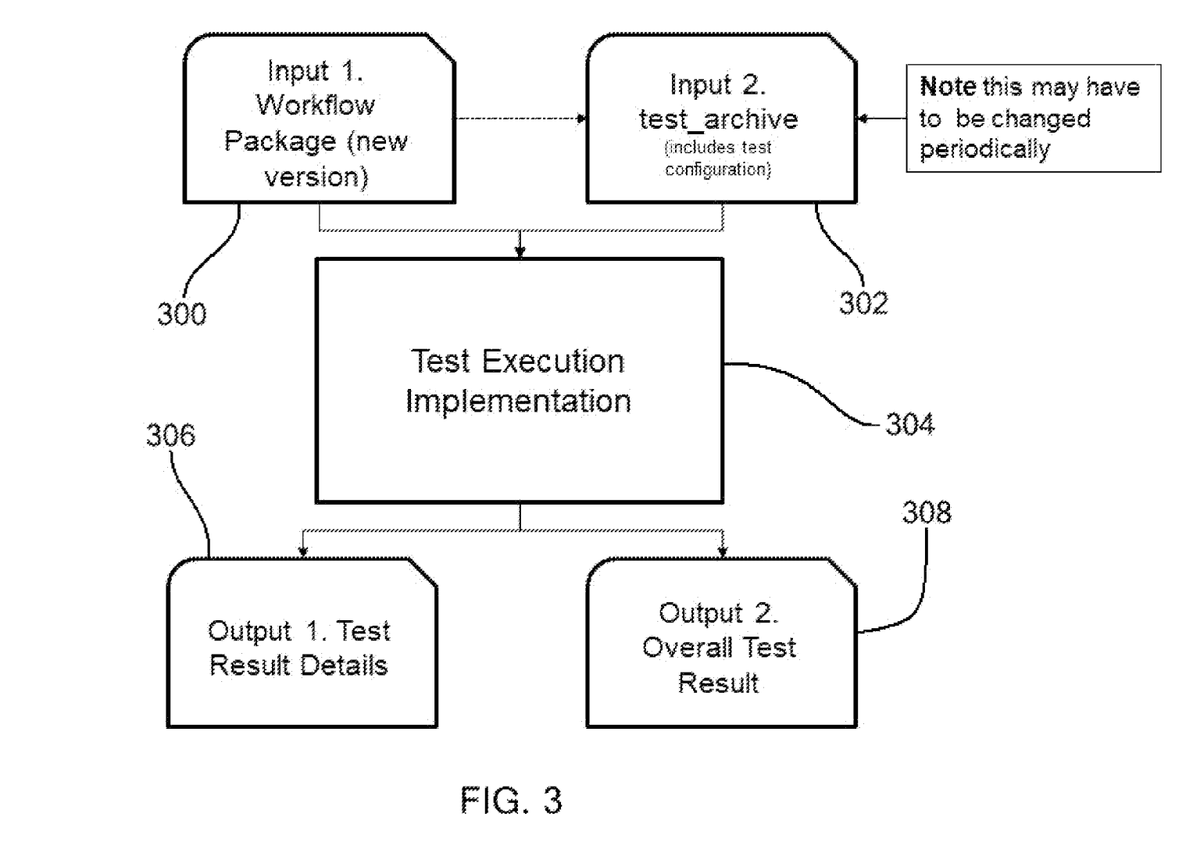
FIG. 3 is an illustration showing inputs and outputs for creating and executing a test harness for workflows, consistent with an illustrative embodiment.
Figure 4:
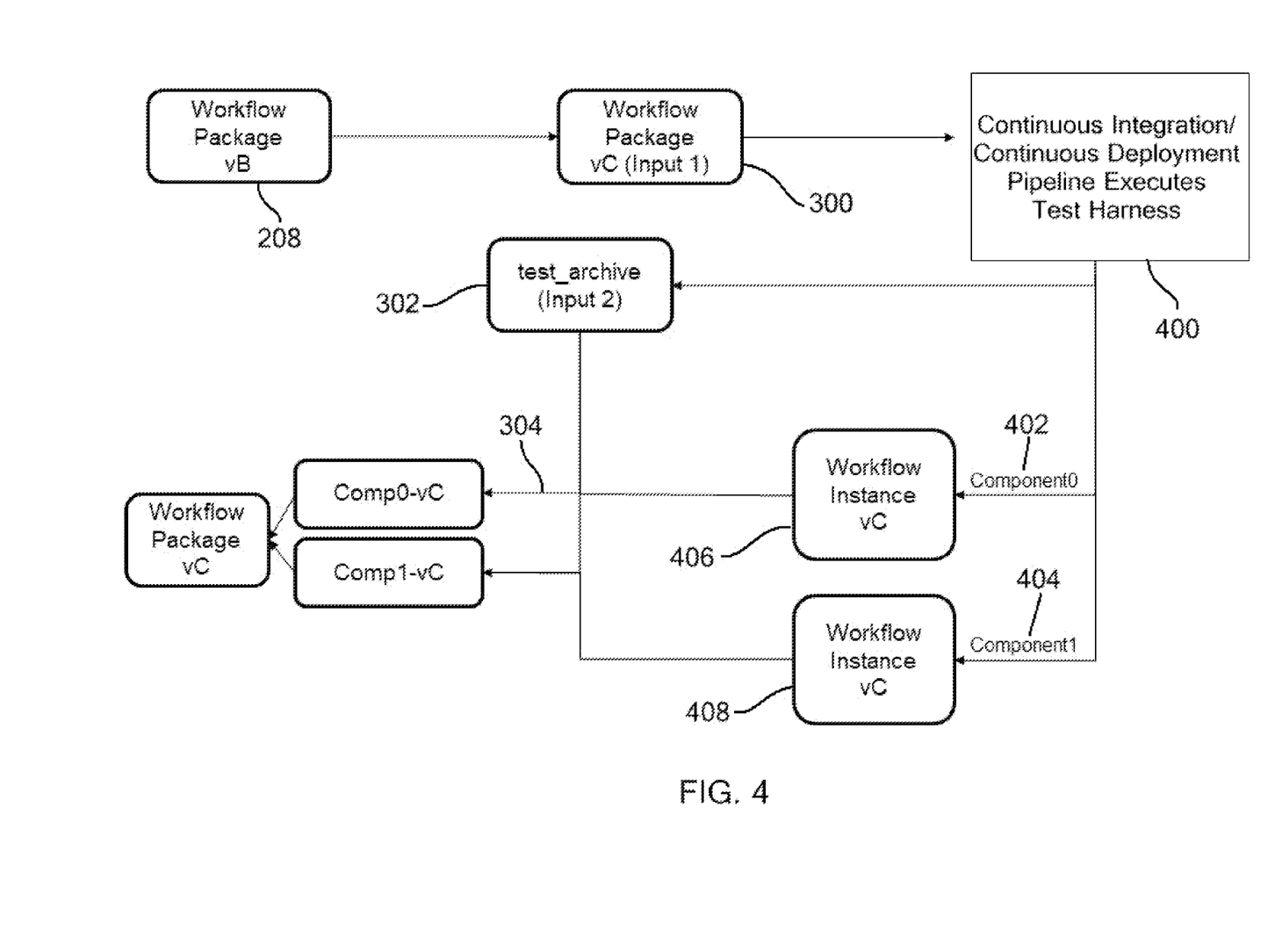
FIG. 4 is a flow chart of a system for creating and executing a test harness for workflows, consistent with an illustrative embodiment.

Referring to FIGS. 3 and 4, workflow package vB 208 can be changed or updated into a new version to generate workflow package vC 300. The updates to the workflow package vB 208 can include, for example, programming changes to one or more components, the addition of one or more new components, or the deletion of one or more components. A continuous integration/continuous development process 400, for example travis, can invoke testify-run to create, for each component, such as component0 402 and component1 404, an instance directory to generate a workflow instance vC 406 for component0 402 and a workflow instance vC 408 for component) 404. While only two components are illustrated, each component to be tested will have its own workflow instance vC generated. The instance directories are populated with input data from the test archive 302 from workflow package vB 208. At process 304, testify-run, for each component, stages its data, executes the workflow instance, checks its new output against the previous output from the test archive 302 and may also execute user provided tests. A first output 306 can include test result details, where, for each component, results of each test run is provided. A second output 308 can include the overall test result, such as "0" if all tests pass and "1" if any test fails. In this example, a single test failure marks the tested version vC of the component and the workflow package vC 300 as failed. If all tests (for all components) pass, then the workflow package vC is marked as successful or valid.

Figure 5:
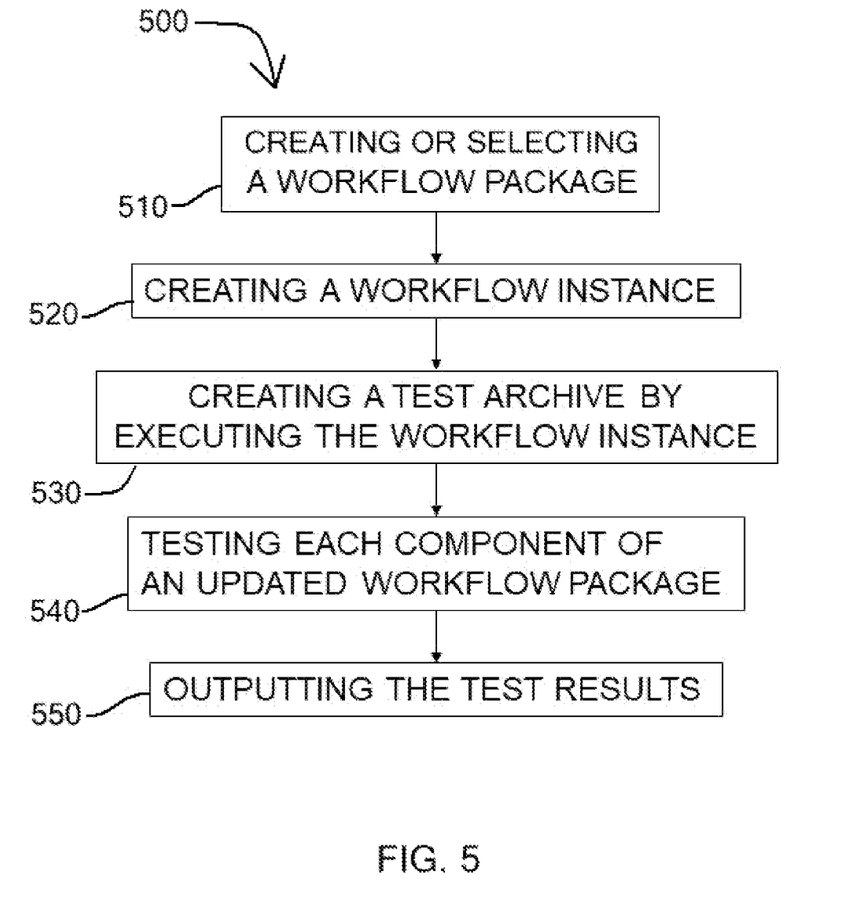
FIG. 5 is a flow chart of acts involved in creating and executing a test harness for workflows, consistent with an illustrative embodiment.

With the foregoing overview of the example system for creating and executing a test harness for a workflow, it may be helpful now to consider a high-level discussion of example processes. To that end, FIG. 5 presents an illustrative process 500 related to methods for creating and executing a test harness for a workflow. Process 500 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Referring to FIG. 5, the process 500 for creating and executing a test harness for a workflow includes an act 510 of creating a workflow package, or selecting an existing one, including a workflow definition and input data. At act 520, the test harness engine can create a workflow instance of a workflow. The workflow instance can include the elements of the workflow package, as well as execution-specific input data and metadata, and workflow component output data. At act 530, a test archive can be created by the test harness engine by executing the workflow instance with the input data. At act 540, when the workflow package is changed or updated by the test harness engine to a new version, each component in the new version of the workflow package can be tested using the test archive for the reference inputs. At act 550, an output of the test results is provided by the test harness engine.

Some changes to a workflow may require creating a new test archive. In some embodiments, the new test archive can be created by executing the new version of the workflow. In other embodiments, the new test archive can be created by only executing sub-graphs of the workflow impacted by the modifications in the workflow. For example, the test harness engine can create a workflow instance of the new workflow. For components that are not impacted by the modifications, such as those that are not eventual consumer nodes of the output of the modified nodes, the test harness engine copies their outputs from the existing test archive. For components added or modified, or consumer nodes of the same, access is given to required execution resources and the test engine executes the sub-graphs of the workflow that originate from these components. In the case of modified components in a workflow, the execution can be limited to those components whose modifications caused them to fail the regression test. The outputs of these executions are placed in the new workflow instance. The test engine can create a new test archive from the new instance.

Figure 6:
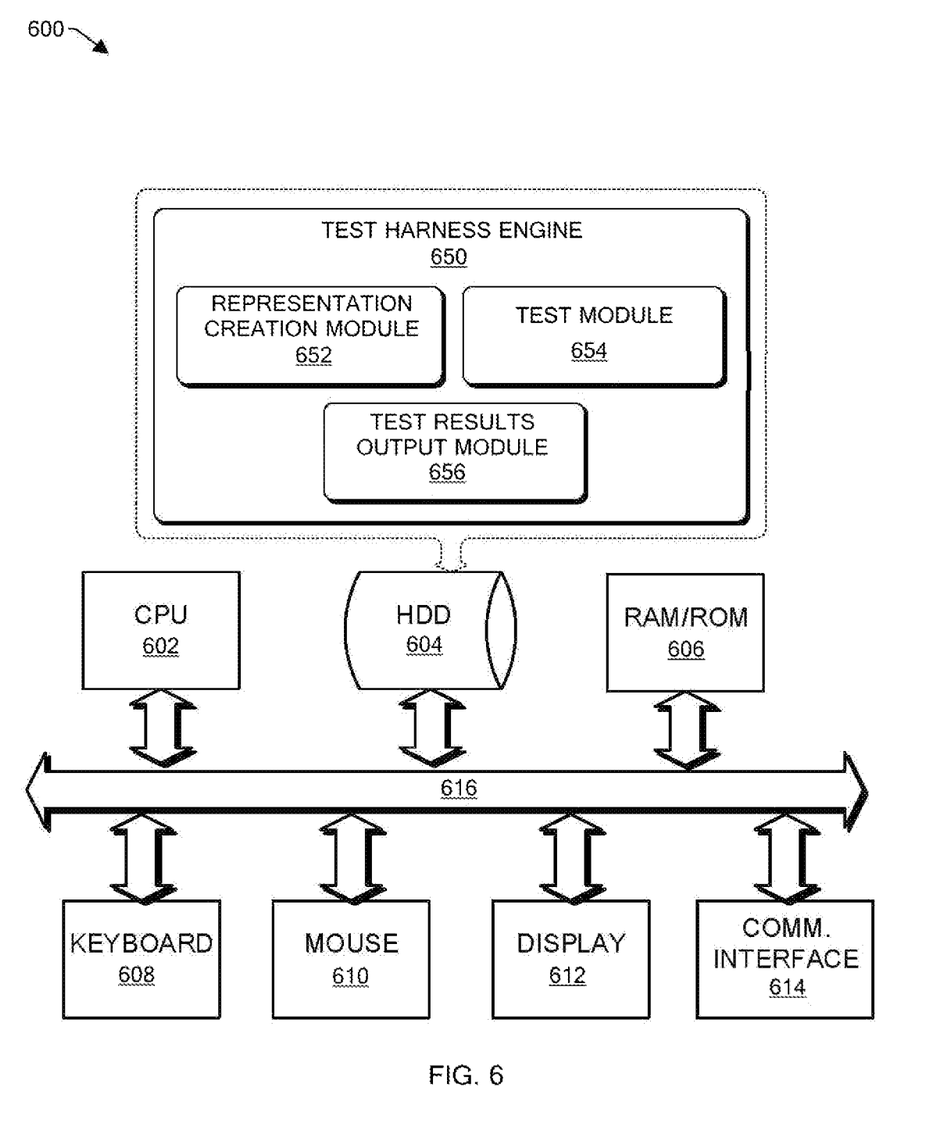
FIG. 6 is a functional block diagram illustration of a particularly configured computer hardware platform that can be used to implement a system for creating and executing a test harness for workflows, consistent with an illustrative embodiment.

FIG. 6 provides a functional block diagram illustration of a computer hardware platform 600 that can be used to implement a particularly configured computing device that can host a test harness creation and execution engine 650. The test harness creation and execution engine 650, as discussed above, can include a representation creation module 652, a testing module 654 and an output module 656.

The computer platform 600 may include a central processing unit (CPU) 602, a hard disk drive (HDD) 604, random access memory (RAM) and/or read only memory (ROM) 606, a keyboard 608, a mouse 610, a display 612, and a communication interface 614, which are connected to a system bus 616.

In one embodiment, the HDD 604, has capabilities that include storing a program that can execute various processes, such as the test harness creation and execution engine 650, in a manner described herein.

Conclusion

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method, comprising:
   automatically creating and executing a test harness for an existing software program workflow, the creating and executing comprising:
      receiving the exiting software program workflow, wherein the existing software program workflow comprises software components;
      automatically creating, by a computing device, a workflow package of a direct acyclic graph (DAG), including a version identification and a workflow graph definition based on the existing workflow;
      creating a workflow instance based on the workflow package;
      executing the workflow instance on the computing device to generate output data;
      saving the workflow instance with the generated output data as a test archive, wherien the generated output data is used as a baseline for an output comparison test;
      augmenting a file structure of the workflow instance, by the test archive, by inserting an input data and the generated output data used as a baseline for the output comparison test, and at least one rule, on one or more tests to be executed on one or more software components in an updated workflow package; and
      testing the one or more softwaqre components of the updated workflow package with the test archive by performing the output comparison test; and
   output an indication of pass or fail of the testing of the updated workflow package based on the testing.

2. The computer implemented method of claim 1, further comprising creating the workflow package including information on a transformation logic for each node.

3. The computer implemented method of claim 1, further comprising generating the output data of the workflow instance via at least one of (a) executing one or more selected subgraphs from a plurality of subgraphs of the workflow to generate output data, and (b) populating other ones of the plurality of subgraphs with subgraph output data from a previously created workflow instance.

4. The computer implemented method of claim 1, wherein the indication includes results from each test performed on each of the one or more components.

5. The computer implemented method of claim 1, wherein the testing includes a plurality of tests comprising an input data test, a data staging test, an execution test, and an output comparison test.

6. The computer implemented method of claim 5, wherein each of the plurality of tests are executed in order, where failure of one of the plurality of tests ends the testing and outputs a failure indication.

7. The computer implemented method of claim 1, further comprising associating a test specification with the test archive, wherein the test specification defines which output data from the one or more components should be added to the test archive.

8. The computer implemented method of claim 1, further comprising associating a test specification with the test archive, wherein the test specification permits customization of the testing and provides definitions of pass and fail.

9. The computer implemented method of claim 1, further comprising permitting additional programs to be provided in a test specification for a selected testing of the one or more components.

10. The computer implemented method of claim 1, further comprising regenerating the test archive based on an instance of the updated workflow package.

11. A computer implemented method of claim 1, wherein:
creating a workflow package of the direct acyclic graph (DAG) includes a transformation logic of each component of one or more components of the workflow;
the testing includes a plurality of tests comprising an input data test, a data staging test, an execution test, and an output comparison test; and
each of the plurality of tests are executed in order, where failure of one of the plurality of tests ends the testing.

12. The computer implemented method of claim 11, wherein the indication includes results from each test performed on each of the one or more components.

13. The computer implemented method of claim 11, further comprising associating a test specification with the test archive, wherein the test specification defines which output data from the one or more components should be added to the test archive.

14. The computer implemented method of claim 11, further comprising associating a test specification with the test archive, wherein the test specification permits customization of the testing and provides definitions of pass and fail.

15. The computer implemented method of claim 11, further comprising regenerating the test archive based on an instance of the updated workflow package.

16. The computer implemented method of claim 1, further comprising creating a separate workflow instance for each software component.

17. A non-transitory computer readable storage medium tangibly embodying a computer readable program code having computer readable instructions that, when executed, causes a computer device to carry out a method:
automatically creating and executing a test harness for an existing software program workflow, the creating and executing comprising:
receiving the existing software program workflow, wherein the existing software program workflow comprises software components;
automatically creating, by a computing device, a workflow package of a direct acyclic graph (DAG); including a version identificaiton and a workflow graph definition based on the existing workflow;
creating a workflow instance based on the workflow package;
executing the workflow instance on the vcomputing device to generate output data;
saving the workflow instance with the generated output data as a test archive, wherein the generated output data is used as a baseline for an output comparison test;
augmenting a file structure of the workflow instance, by the test archive, by inserting an input data and the generated output data used as a baseline for the output cmparison test, and at least one rule, on one or more tests to be executed on one or more software components in an updated workflow package; and
testing the one or more software components of the updated workflow package with the test archive by performing the output comparison test; and
outputting an indication of pass of fail of the tsting of the updated workflow package based on the testing.

18. The non-transitory computer readable storage medium of claim 17, wherein the testing includes a plurality of tests comprising an input data test, a data staging test, an execution test, and an output comparison test.

19. The non-transitory computer readable storage medium of claim 18, wherein if one of the plurality of tests fail for a given component, the indication provided is a failure indication for both the given component and the workflow.

20. The non-transitory computer readable storage medium of claim 18, wherein each of the plurality of tests are executed in order, where failure of one of the plurality of tests ends the testing and outputs a failure indication.

21. The non-transitory computer readable storage medium of claim 17, wherein the execution of the code by the processor further configures the computing device to perform an act comprising associating a test specification with the test archive, wherein the test specification defines which of output data from the one or more components should be added to the test archive.

22. The non-transitory computer readable storage medium of claim 17, wherein the execution of the code by the processor further configures the computing device to perform an act comprising associating a test specification with the test archive, wherein the test specification permits customization of the testing and provides definitions of pass and fail.

23. The non-transitory computer readable storage medium of claim 17, wherein:
creating a workflow package of the direct acyclic graph (DAG) includes a transformation logic of each component of one or more components of the workflow;
the testing includes a plurality of tests comprising an input data test, a data staging test, an execution test, and an output comparison test; and
each of the plurality of tests are executed in order, where failure of one of the plurality of tests ends the testing.

24. The non-transitory computer readable storage medium of claim 23, wherein the execution of the code by the processor further configures the computing device to perform an act comprising associating a test specification with the test archive, wherein the test specification defines which of output data from the one or more components should be added to the test archive.

25. The non-transitory computer readable storage medium of claim 23, wherein the execution of the code by the processor further configures the computing device to perform an act associating a test specification with the test archive, wherein the test specification permits customization of the testing and provides definitions of pass and fail.

26. The non-transitory computer readable storage medium of claim 23, wherein the execution of the code by the processor further configures the computing device to perform an act comprising regenerating the test archive based on an instance of the updated workflow package.

* * * * *